US012603310B2

(12) United States Patent
Sato

(10) Patent No.: US 12,603,310 B2
(45) Date of Patent: Apr. 14, 2026

(54) FUEL CELL SYSTEM

(71) Applicant: TOYOTA JIDOSHA KABUSHIKI KAISHA, Toyota (JP)

(72) Inventor: Hiromichi Sato, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 547 days.

(21) Appl. No.: 18/171,414

(22) Filed: Feb. 20, 2023

(65) Prior Publication Data

US 2023/0282850 A1     Sep. 7, 2023

(30) Foreign Application Priority Data

Mar. 1, 2022   (JP) ................................. 2022-030711

(51) Int. Cl.
H01M 8/04664 (2016.01)
H01M 8/04029 (2016.01)
H01M 8/04537 (2016.01)

(52) U.S. Cl.
CPC ... H01M 8/04664 (2013.01); H01M 8/04029 (2013.01); H01M 8/04634 (2013.01)

(58) Field of Classification Search
CPC ......... H01M 8/04664; H01M 8/04029; H01M 8/04634
See application file for complete search history.

(56) References Cited

U.S. PATENT DOCUMENTS

| | | | | |
|---|---|---|---|---|
| 2002/0164511 A1* | 11/2002 | Uozumi | ............ | H01M 8/04029 |
| | | | | 429/429 |
| 2018/0241058 A1* | 8/2018 | Fujioka | ............ | H01M 8/04567 |
| 2021/0020966 A1* | 1/2021 | Yamaue | ............ | H01M 8/04074 |

FOREIGN PATENT DOCUMENTS

| | | |
|---|---|---|
| JP | 2007120844 A | 5/2007 |
| JP | 2011124043 A | 6/2011 |
| JP | 2014157780 A | 8/2014 |
| JP | 2016212972 A | 12/2016 |
| JP | 2018137176 A | 8/2018 |
| JP | 2019091658 A | 6/2019 |

* cited by examiner

*Primary Examiner* — Nicole M. Buie-Hatcher
*Assistant Examiner* — Taylor Harrison Krone
(74) *Attorney, Agent, or Firm* — Dickinson Wright, PLLC

(57)     ABSTRACT

A main object of the present disclosure is to provide a fuel cell system capable of rapidly determining occurrence of a leak. The present disclosure achieves the object by providing a fuel cell system comprising: a fuel cell, a coolant circuit that circulates a cooling liquid to cool the fuel cell, a conductivity meter that measures a conductivity of the cooling liquid, and a determination device that determines a leak of the cooling liquid; wherein the determination device includes: an acquisition unit that acquires a conductivity of the cooling liquid from the conductivity meter, and a determination unit that determines a leak of the cooling liquid based on a fluctuation of the conductivity.

4 Claims, 3 Drawing Sheets

FUEL CELL SYSTEM

TECHNICAL FIELD

The present disclosure relates to a fuel cell system.

BACKGROUND ART

A fuel cell system is a system of generating power by supplying a fuel gas and an oxidant gas to a fuel cell including a fuel electrode, an electrolyte film, and an oxygen electrode. Also, it has been known that, in the fuel cell system, in order to obtain sufficient power generation performance, a temperature inside the fuel cell is adjusted to a suitable temperature by circulating a cooling liquid. Also, a method for detecting a leak of the cooling liquid circulated has been known.

For example, Patent Literature 1 discloses a fuel cell system that determines a cooling liquid leakage when the insulating voltage detected by an insulating voltage detector is larger than an insulating voltage at the time of ignition-off. Also, Patent Literature 2 discloses a fuel cell system that detects presence or absence of a refrigerant leakage based on changes in water level of the refrigerant in a refrigerant tank detected by a leak sensor. Also, Patent Literature 3 discloses a fuel cell system including presence or absence of a cooling liquid leak determined by an output of a cooling liquid circulating pump and a cooling liquid temperature of a fuel cell.

CITATION LIST

Patent Literatures

Patent Literature 1: Japanese Patent Application Laid-Open (JP-A) No. 2018-137176
Patent Literature 2: JP-A No. 2014-157780
Patent Literature 3: JP-A No. 2011-124043

SUMMARY OF DISCLOSURE

Technical Problem

From the viewpoint of improving safety of a fuel cell system, rapid detection of a leakage of a cooling liquid leakage (leak) is preferable. The present disclosure has been made in view of the above circumstances, and a main object thereof is to provide a fuel cell system capable of rapidly determining occurrence of a leak.

Solution to Problem

In order to achieve the object, the present disclosure provides a fuel cell system comprising: a fuel cell, a coolant circuit that circulates a cooling liquid to cool the fuel cell, a conductivity meter that measures a conductivity of the cooling liquid, and a determination device that determines a leak of the cooling liquid; wherein the determination device includes: an acquisition unit that acquires a conductivity of the cooling liquid from the conductivity meter, and a determination unit that determines a leak of the cooling liquid based on a fluctuation of the conductivity.

According to the present disclosure, presence of absence of the leak of the cooling liquid is determined based on a fluctuation of the conductivity, and thus the occurrence of the leak can be rapidly determined.

In the disclosure, the determination unit may determine a leak of the cooling liquid based on a fluctuation due to conductivity change width, and a number of times of the fluctuation, within a specified time range.

In the disclosure, the determination unit may determine a leak of the cooling liquid based on a fluctuation due to conductivity change rate, and a number of times of the fluctuation, within a specified time range.

Advantageous Effects of Disclosure

The present disclosure exhibits an effect of rapidly determining occurrence of the leak.

DESCRIPTION OF EMBODIMENTS

The fuel cell system in the present disclosure will be hereinafter explained in details.

Figure 1:
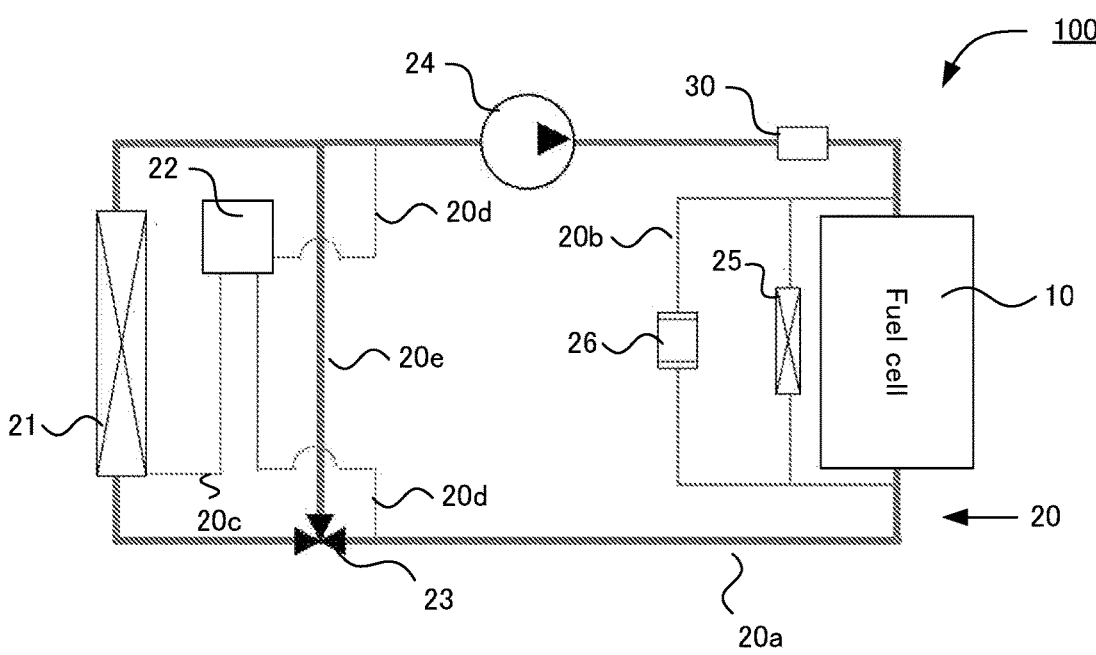
FIG. 1 is a schematic diagram exemplifying the structure of the fuel cell system in the present disclosure.

FIG. 1 is a schematic diagram exemplifying the structure of the fuel cell system in the present disclosure. Fuel cell system 100 shown in FIG. 1 includes fuel cell 10, coolant circuit 20 that circulates a cooling liquid to cool the fuel cell 10, and conductivity meter 30 that measures a conductivity of the cooling liquid. Also, although not illustrated in particular, the fuel cell system in the present disclosure includes an electronic control unit (ECU) that conducts various controls. ECU conducts various controls of the fuel cell system, and also works as a determination device described later. The fuel cell, the coolant circuit, the conductivity meter and the determination device will be described later.

According to the present disclosure, presence or absence of the leak of the cooling liquid is determined based on a fluctuation of the conductivity, and thus the occurrence of the leak can be rapidly determined.

Figure 2:
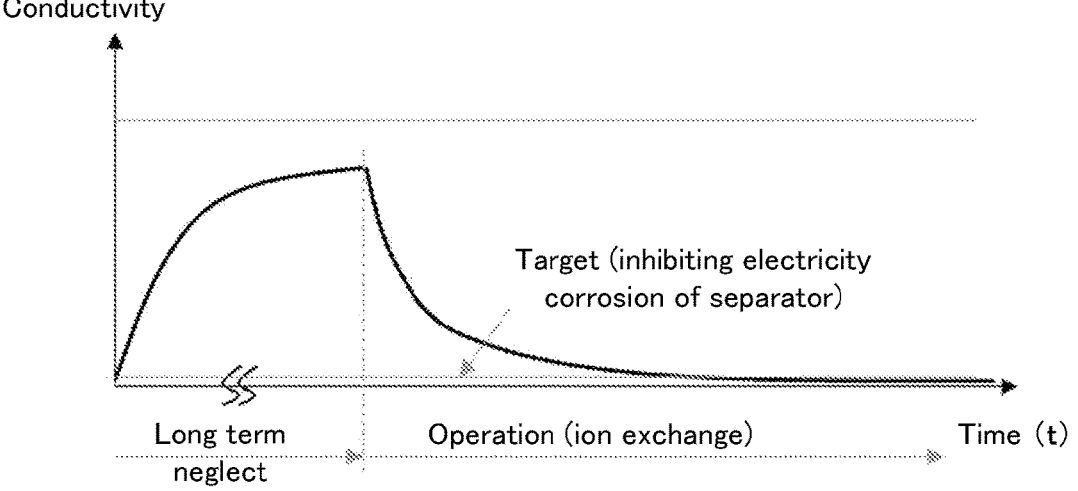
FIG. 2 is a diagram explaining the fluctuation in the conductivity of the cooling liquid.

As described above, methods for detecting the leakage of the cooling liquid have been studied. Meanwhile, as in Patent Literature 1, in the detecting method based on the insulating voltage, rapid detection of the leakage may be difficult depending on materials of the fuel cell and control conditions. For example, as shown in FIG. 2, from requirement of high voltage safety, the insulating voltage at the time of ignition-off (t=0) will be high when the conductivity of the cooling liquid is degraded by an ion exchanger. Meanwhile, when ion elution occurs from components when the period until restarting the fuel cell system is long, the conductivity of the cooling liquid will increase to degrade the insulating voltage upon the restarting. In such a case, there is a risk that occurrence of the leak may not be rapidly detected until the conductivity of the cooling liquid decreases. Also, when SUS is used as a separator in a fuel cell, for example, as shown in FIG. 2, the target conductivity during operation may be set low in order to inhibit corrosion. In this case, when the conductivity is increased due to the ignition-off for a long period of time, it may be difficult to detect the difference from the normal time right after occurrence of the leakage, compared to the insulating conductivity at the time of the ignition-off.

Also, as in Patent Literature 2, in a method of detecting the leakage of a cooling liquid by monitoring a water level of a coolant tank (reserve tank) that keeps the cooling liquid, when the reserve tank is so-called simple sealed type, the water level of the reserve tank does not change even if a hole is made in a radiator; thus, it is difficult to detect the leak. Also when the reserve tank is so-called complete sealed type, it is difficult to rapidly detect the leak. The reason therefor is because, although the water level in the reserve tank goes down by air biting due to the leakage of the cooling liquid, the amount of the cooling liquid divided to the reserve tank is little, and the fluctuation in the water level is gentle.

Also, as in Patent Literature 3, in a method of detecting a cooling liquid leakage from the pump consumption amount, the detection is difficult while the leakage amount is little. In particular, when the cooling liquid temperature is increased, there is a little margin until reaching to the upper limit temperature of the cooling liquid, and thus there is a risk that the temperature may be already over the upper limit when the leakage amount reaches at the detectable amount.

In contrast, the fuel cell system in the present disclosure determines a leak of the cooling liquid based on a fluctuation of the conductivity. When air biting occurs along with the leakage of the cooling liquid, the state of the conductivity meter always contacting the cooling liquid will be a state of randomly contacting air and the cooling liquid. When the conductivity meter contacts the air, the conductivity decreases along with the increase of the resistance, and the conductivity to be measured will flap. The leak can be detected based on such a flapping of the conductivity, and thus the leak can be rapidly detected without depending on the materials of the fuel cell and the operation conditions.

1. Fuel Cell

Figure 3:
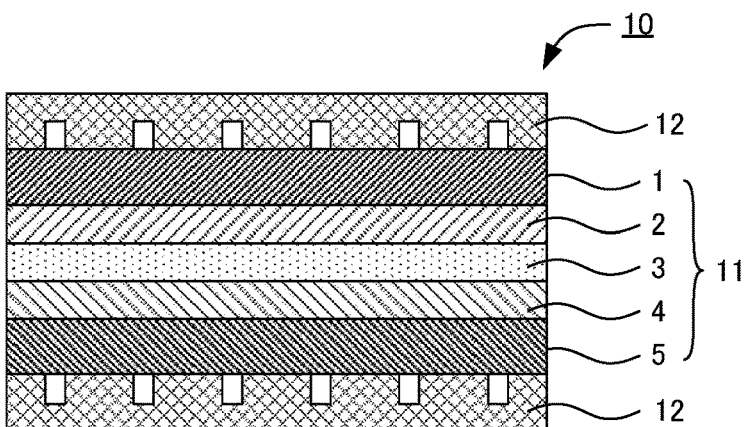
FIG. 3 is a schematic cross-sectional view exemplifying the fuel cell in the present disclosure.

FIG. 3 is a schematic cross-sectional view exemplifying the fuel cell in the present disclosure. Fuel cell (single cell) 10 shown in FIG. 3 includes membrane—electrode assembly (MEA) 11 including layers in the order of: cathode side gas dispersing layer 1, cathode catalyst layer 2, electrolyte film 3, anode catalyst later 4, and anode side gas dispersing layer 5; and two pieces of separator 12 that holds the MEA 11. The fuel cell may be a single cell, and may be a layered body in which a plurality of the single cell is layered.

Examples of the electrolyte film may include a fluorine based electrolyte film such as a perfluoro sulfonic acid film, and a non-fluorine based electrolyte film. Examples of the non-fluorine based electrolyte film may include a hydrocarbon based electrolyte film. The thickness of the electrolyte film is, for example, 5 μm or more and 100 μm or less.

The cathode catalyst layer and the anode catalyst layer include, for example, a catalyst metal promoting electrochemical reactions, a base material supporting the catalyst metal, an electrolyte with proton conductivity, and a carbon particle with electron conductivity. Examples of the catalyst metal may include a simple substance of metal such as Pt (platinum) and Ru (ruthenium), and an alloy including Pt. Examples of the electrolyte may include a fluorine based resin. In addition, examples of the base material and a conductive material may include a carbon material such as carbon. The thickness of the cathode catalyst layer and the anode catalyst layer is, for example, respectively 5 μm or more and 100 μm or less.

The anode side gas dispersing layer and the cathode side gas dispersing layer may be a conductive member with gas permeability. Examples of the conductive member may include a carbon porous body such as a carbon cloth and a carbon paper, and a metal porous body such as a metal mesh and a foamed metal. The thickness of the anode side gas dispersing layer and the cathode side gas dispersing layer is, for example, respectively 5 μm or more and 100 μm or less.

The separator may include a gas passage in the surface facing the gas dispersing layers (the anode side gas dispersing layer and the cathode side gas dispersing layer). Examples of the material of the separator may include a metal material such as stainless steel, and a carbon material such as a carbon composite material. Incidentally, this separator has electron conductivity, and also works as a current collector of electricity generated.

2. Coolant Circuit

The coolant circuit in the present disclosure is a passage that circulates a cooling liquid to cool the fuel cell. The coolant circuit is usually configured so that the cooling liquid flowed out from the fuel cell is to flow again into the fuel cell.

An example of the coolant circuit in the present disclosure will be explained with reference to drawings. Coolant circuit 20 shown in FIG. 1 includes main passage 20a and bypass passage 20b to 20e. The main passage 20a is a circular passage that cools the cooling liquid flowed out from fuel cell 10 by radiator 21, and to flow again into the fuel cell 10. The bypass passage 20b to 20e is respectively a passage branched off from the main passage 20a.

In the main passage 20a, arranged are radiator 21 that cools the cooling liquid by heat exchanging, pump 24 that pumps the cooling liquid, and three way valve 23 that adjusts the flow amount of the cooling liquid. In the bypass passage 20b, arranged is ion exchanger 26 that absorbs and removes ions from the cooling liquid. Also, as illustrated, inter cooler 25 that conducts heat exchanging between the cooling liquid and the air supplied to the fuel cell 10 may be arranged in the bypass passage 20b. The bypass passage 20c is a passage communicating radiator 21 and reserve tank 23. The reserve tank 23 may be a complete sealed type, and may be a simple sealed type. Also, the coolant circuit 20 shown in FIG. 1 includes bypass passage 20d that stores the cooling liquid flowed out from the fuel cell 10 in the reserve tank 23, and flows out the cooling liquid from the reserve tank 23 to the main passage 20a. Also, the coolant circuit 20 includes a bypass passage 20e configured to make the cooling liquid flowed out from the fuel cell 10 to flow again into the fuel cell without passing the radiator 21 and the reserve tank 23.

Also, members such as a temperature sensor that measures the temperature of the cooling liquid may be arranged in the coolant circuit. There are no particular limitations on the above described members and devices, and general materials may be used. Also, as the cooling liquid, a general cooling liquid may be used. The cooling liquid may be water, and may be an anti-freezing solution such as an ethylene glycol-containing liquid.

3. Conductivity Meter

The conductivity meter is usually arranged in the above described coolant circuit. The number of the conductivity meter is not particularly limited, and it may be one, and may be two or more.

There are no limitations on the setting place of the conductivity meter. The conductivity meter may be, for example, as shown in FIG. 1, arranged in an exit side of the pump 24. The reason therefor is because the leak can be more easily detected when the air mixed due to the leak is dispersed by the pump. Also, the conductivity meter may be, for example, arranged in an exit side of the radiator such as the upper side of the radiator 21 in FIG. 1. The reason therefor is to rapidly detect the occurrence of the leak in the radiator. Also, as shown in FIG. 1, the conductivity meter may be arranged on the bypass passage 20*b*. The reason therefor is such that, in the setting temperature of the fuel cell, the cooling liquid may be circulated without passing through the radiator, and even in such a case, the leak can be rapidly detected.

The setting place of the conductivity meter may be one place, and may be two places or more. Also, as the conductivity meter, conventionally known conductivity meter may be used.

4. Determination Device (1) Configuration of Determination Device

The fuel cell system in the present disclosure comprises a determination device that determines a leak of the cooling liquid. The determination device is configured to determine a leak of the cooling liquid based on a fluctuation of the conductivity obtained from the conductivity meter. As described above, the Electronic Control Unit (ECU) also works as the determination device in the present disclosure, and includes a CPU (Central Processing Unit), a memory, and an input and output port that inputs and outputs various signals. Examples of the memory may include ROM (Read Only Memory), RAM (Random Access Memory), and rewritable non-volatile memory. When the CPC executes programs memorized in the memory, various controls run. Various controls executed by the ECU are not limited to processing by a software, but processing by a hardware (electronic circuit) dedicated thereto is also possible.

The determination device includes an acquisition unit and a determination unit as processing blocks configured to achieve its functions. The acquisition unit is configured to acquire the conductivity of the cooling liquid measured by the conductivity meter over time.

Figure 4A:
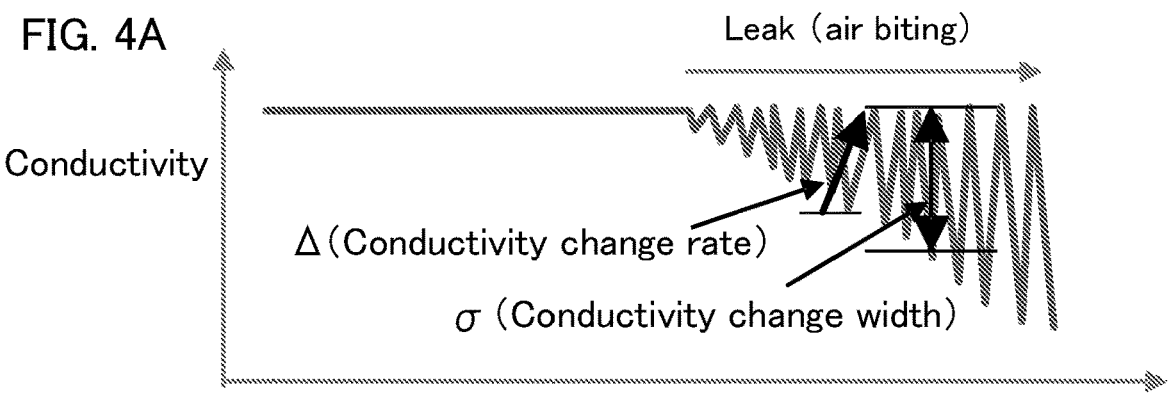
FIGS. 4A and 4B are diagrams explaining an example of a method for determining the leak in the present disclosure.
Figure 4B:
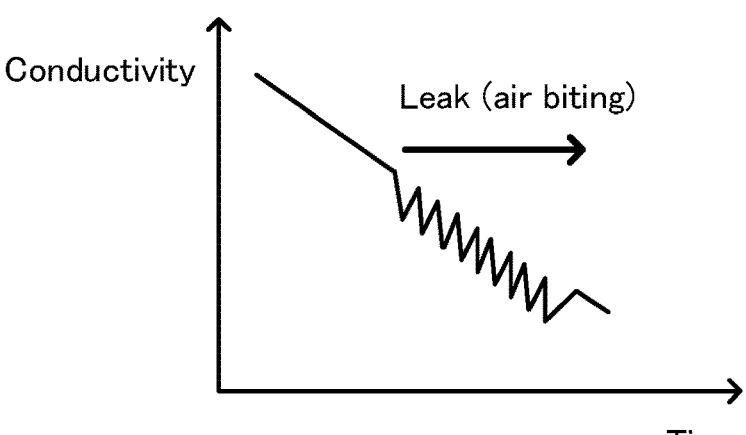

The determination unit is configured to determine a leak of the cooling liquid based on a fluctuation of the conductivity. FIGS. 4A and 4B are explanatory diagrams explaining an example of the method for determining the leak in the present disclosure. As shown in FIGS. 4A and 4B, if air is mixed in the cooling liquid along with the leak, the conductivity would be low when the conductivity meter contacts the air, and the conductivity would be high when the air passes through and contacts the cooling liquid again. As a result, flapping of the conductivity occurs. Incidentally, the determination unit may, as shown in FIG. 4A, determine the presence or absence of the leak based on the fluctuation of the conductivity when the conductivity is constant, and as shown in FIG. 4B, may determine the presence or absence of the leak based on the fluctuation of the conductivity during the conductivity of the cooling liquid is changing (dropping) due to factors such as ion exchanging.

The determination unit may determine a leak of the cooling liquid based on a fluctuation due to conductivity change width, and a number of times of the fluctuation, within a specified time range. In other words, it may determine the leak of the cooling liquid when the fluctuation due to the conductivity change width σ or more occurs for N times or more within a specified time range.

The "specified time range" is, for example, 1 second or more, may be 3 seconds or more, and may be 5 seconds or more. Meanwhile, the "specified time range" is, for example, 10 seconds or less.

The conductivity change width σ is, for example, 0.5 mS/m or more, may be 0.7 mS/m or more, and may be 1.0 mS/m or more. Meanwhile, the conductivity change width σ is, for example, 2.0 mS/m or less, and may be 1.5 mS/m or less. As shown in FIGS. 4A and 4B, the conductivity change width σ may be obtained as a difference between the conductivity at the time of the peak start or the peak end of the concave part of the conductivity, and the conductivity at the time of the bottom peak of the concave part.

The number of times of the fluctuation (N) may be 1, and may be 2 or more, but preferably 2 or more. The reason therefor is to clearly distinct the flapping of the conductivity due to the noise (such as electronic noise) of the conductivity from the flapping of the conductivity due to the leak. When the number of times of the fluctuation (N) is 2 or more, the N may be 2, may be 5 or more, and may be 10 or more. Meanwhile, the N may be, for example, 20 or less. Here, the number of times of the fluctuation can be taken as the number of times the peak of the concave part of the conductivity is observed within the specified time range.

Also, in the conductivity, the time of one period (time from the peak start of the concave part until the peak end) is, for example, 0.5 seconds or more, and may be 1 second or more. Meanwhile, the time of the one period is, for example, 10 seconds or less. Here, for example, when ions pooled in the coolant circuit pass through the conductivity meter, there is a risk that the decrease and increase of the conductivity may occur. The fluctuation of the conductivity in such case is considered milder compared to the fluctuation due to air biting, and thus if the time of the one period is too long, there is a risk that the detection accuracy of the leak may be degraded.

The determination unit may determine a leak of the cooling liquid based on a fluctuation due to conductivity change rate, and a number of times of the fluctuation, within a specified time range. In other words, it may determine the leak of the cooling liquid when the fluctuation due to conductivity change rate Δ or more occurs for N times or more within a specified time range.

The conductivity change rate Δ is, for example, 105% or more, may be 110% or more, and may be 120% or more. Meanwhile, the conductivity change rate Δ is, for example, 200% or less, and may be 150% or less. As shown in FIGS. 4A and 4B, the conductivity change rate Δ can be obtained as a ratio of the conductivity at the time of the peak start or the peak end with respect to the conductivity at the time of the bottom peak, of the concave part of the conductivity.

Examples of the "specified time range" may include the time range same as that in the determination based on the conductivity change width σ described above. Also, examples of the number of times of the fluctuation (N) of the conductivity change rate Δ or more may include the number of times same as the number of times of the fluctuation (N) in the determination based on the conductivity change width σ described above.

(2) Process of Determination Device

Figure 5:
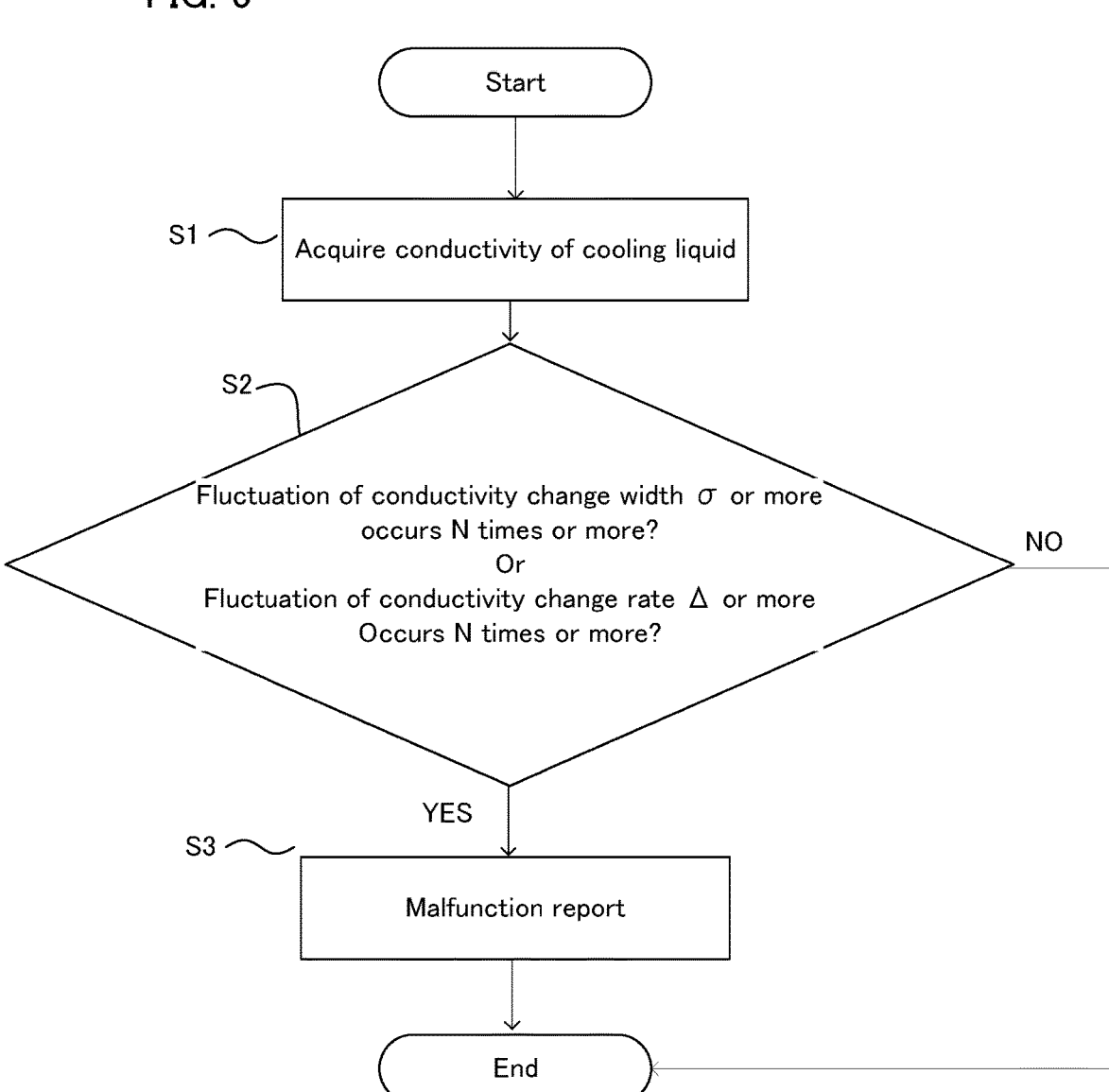
FIG. 5 is a flow chart exemplifying processes of the determination device in the present disclosure.

FIG. 5 is a flow chart exemplifying processes of the determination device in the present disclosure. In the step S1, a conductivity of the cooling liquid measured by the conductivity meter is acquired. In the step S2, based on the acquired conductivity, occurrence of a leak is determined when the fluctuation of the conductivity change width σ or more occurs N times or more. Or, in the step S2, based on the acquired conductivity, occurrence of a leak is determined when the fluctuation of the conductivity change rate Δ or more occurs N times or more. If it is determined that the leak occurred in the step S2, the determination device proceeds to the step S3 to report the malfunction occurrence, and processes end.

The present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

REFERENCE SIGNS LIST 10 fuel cell
11 membrane—electrode assembly
12 separator
20 coolant circuit
21 radiator
22 reserve tank
23 three way valve
24 pump
25 inter cooler
26 ion exchanger
30 conductivity meter
100 fuel cell system

What is claimed is:

1. A fuel cell system comprising:
a fuel cell,
a coolant circuit that circulates a cooling liquid to cool the fuel cell,
a conductivity meter that measures a conductivity of the cooling liquid, and
a determination device that determines a leak of the cooling liquid; wherein
the determination device includes:
an acquisition unit that acquires a conductivity of the cooling liquid from the conductivity meter, and
a determination unit that determines a leak of the cooling liquid based on a fluctuation of the conductivity,
wherein the determination unit determines a leak of the cooling liquid based on a fluctuation due to conductivity change width which is obtained as a difference between the conductivity at the time of the peak start or the peak end of the concave part of the conductivity and the conductivity at the time of the bottom peak of the concave part, and a number of times of the fluctuation, within a specified time range of 1 second or more and 10 seconds or less.

2. The fuel cell system according to claim 1, wherein the leak of the cooling liquid is determined when the conductivity change width is 0.5 mS/m or more and 2.0 mS/m or less, and the number of times of the fluctuation of the conductivity change width is 2 or more.

3. A fuel cell system comprising:
a fuel cell,
a coolant circuit that circulates a cooling liquid to cool the fuel cell,
a conductivity meter that measures a conductivity of the cooling liquid, and
a determination device that determines a leak of the cooling liquid; wherein
the determination device includes:
an acquisition unit that acquires a conductivity of the cooling liquid from the conductivity meter, and
a determination unit that determines a leak of the cooling liquid based on a fluctuation of the conductivity,
which is obtained as a ratio of the conductivity at the time of the peak start or the peak end with respect to the conductivity at the time of the bottom peak of a concave part of the conductivity
wherein the determination unit determines a leak of the cooling liquid based on a fluctuation due to conductivity change rate which is obtained as a ratio of the conductivity at the time of the peak start or the peak end with respect to the conductivity at the time of the bottom peak of a concave part of the conductivity, and a number of times of the fluctuation, within a specified time range of 1 second or more and 10 seconds or less.

4. The fuel cell system according to claim 3, wherein the leak of the cooling liquid is determined when the fluctuation due to the conductivity change rate is 105% or more and 200% or less, and the number of times of the fluctuation of the conductivity change rate is 2 or more.

* * * * *